United States Patent [19]

Sommer et al.

[11] Patent Number: 5,224,984
[45] Date of Patent: Jul. 6, 1993

[54] PROCESS FOR TREATMENT AND PURIFICATION OF WASTE GASES FROM A SECONDARY ALUMINUM MELTING PLANT

[75] Inventors: Hermann W. Sommer; Robert Schloderer, both of Munich, Fed. Rep. of Germany; Franz P. Neubacher, Stockerau, Austria

[73] Assignee: SMG Sommer Metallwerke GmbH, Emmering, Fed. Rep. of Germany

[21] Appl. No.: 736,831

[22] Filed: Jul. 29, 1991

[30] Foreign Application Priority Data

Nov. 23, 1990 [DE] Fed. Rep. of Germany ....... 4037370

[51] Int. Cl.$^5$ ............................................ C22B 21/06
[52] U.S. Cl. ........................................ 75/403; 75/687; 75/586
[58] Field of Search ................ 75/687, 403, 586; 266/145

[56] References Cited

U.S. PATENT DOCUMENTS

| 4,010,935 | 3/1977 | Stephens | 75/687 |
| 4,019,896 | 4/1977 | Appleby | 75/687 |
| 4,601,750 | 7/1986 | Robak et al. | 75/687 |

FOREIGN PATENT DOCUMENTS

1497437  7/1989  U.S.S.R. .............................. 266/145

OTHER PUBLICATIONS

Ullmann's Encyclopedia of Industrial Chemistry, Fifth Edition, 1988, vol. B2, pp. 13-1 to 13-34.

Primary Examiner—Melvyn J. Andrews
Attorney, Agent, or Firm—Jordan and Hamburg

[57] ABSTRACT

A process and an apparatus for purifying waste gases from a secondary aluminum melting plant are provided, by which the individual waste gas flows are collected and thermally post-combusted, wherein the generation of the energy necessary for post-combustion is provided by waste substances of high caloric value.

4 Claims, 1 Drawing Sheet

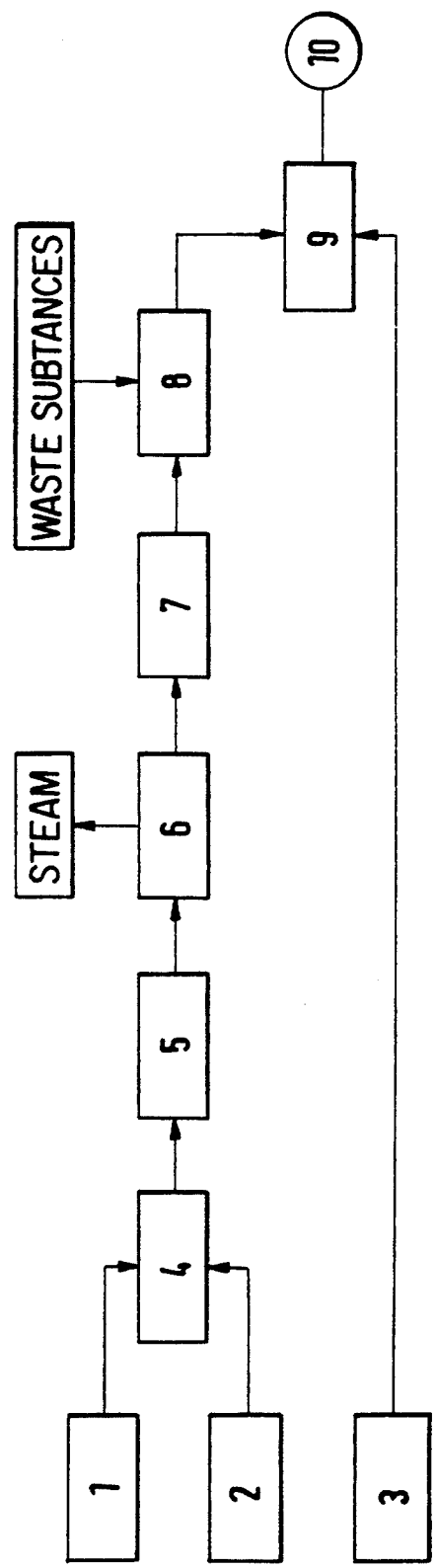

PROCESS FOR TREATMENT AND PURIFICATION OF WASTE GASES FROM A SECONDARY ALUMINUM MELTING PLANT

BACKGROUND OF THE INVENTION

Secondary aluminum melting plants provide the processing and melting of aluminum scrap, metallurgic treatment and the refinement of melts as well as the casting of blocks or the further transportation in liquid form.

Scrap material is melted, for example, clean or painted sheet scrap, foils, new or old foundry scrap, dross and shavings.

A conventional secondary aluminum melting plant operates according to the following process. The scrap is sorted and processed. Scrap which is uniform with respect to its proportion of foreign material and alloys is directly melted. Shavings are thermally purified and dried in processing equipment for shavings. Aluminum pellets are mechanically processed in grinding and sifting devices.

The melting of processed scrap takes place batchwise in rotary drum kilns with a melting salt, which takes up contaminations and which is renewed when necessary. The melting salt from natural sources consists mainly of a mixture of common salt (NaCl, KCl) and the addition of about 2% $CaF_2$. About 300 to 400 kg salt is required to remelt one tone of metal alloys. The used melting salt is poured off into open containers as a salt slag and intermediately stored after hardening to a compact mass until transportation to the salt slag recovery plant. The metal melt from the rotary drum furnace is transferred to heat retention furnaces (converters) in which the melt is metallurgically treated, post-purified (refined) and made into alloys. The refinement takes place by introducing refining gases (chlorine, nitrogen, argon). The materials separated in this treatment float to the top and are separated as dross. This dross is then processed and remelted. The processed melt is then cast as blocks or filled into insulated containers for liquid transport to a foundry.

The waste gases of the drum furnace and the heat retention furnace (converter) ware fed to a waste gas channel system. The raw gases are fed via sheet metal piping to a heat exchanger. The final separation of particulates takes place in subsequent flat tube filters. The particulate matter is transported to a central particulate disposal point. The purified waste gas flows through a subsequent draft fan and chimney to the atmosphere. The purified gas values correspond to the German emissions specification TA Luft 1986.

Today, however, more stringent requirements are made on waste gas purification which can no longer be realized in conventional smelting plants. Problems arise in particular with respect to the maintenance of the total carbon value and the limits for dioxin, to be issued in the near future.

The object of the invention therefore is to provide a process and an apparatus with which the waste gases arising when melting and treating aluminum scrap in a secondary melting plant can be effectively purified and freed of hazardous substances.

SUMMARY OF THE INVENTION

According to the invention, a process is provided in which the individual waste gas flows from a melting stage and a drying stage are collected and thermally combusted, in which the energy necessary for post-combustion is generated from waste substances and in which the post-combusted waste gases are purified together with the gases arising in the metallurgical treatment and subsequent alloying of the scrap, wherein the purified gases are discharged via a flue stack.

In certain embodiments of the invention, waste gases leaving the melting stage at a temperature of about 800° C. to 900° C. and the drying stage at a temperature of about 400° C. to 500° C. are mixed and passed over a course separator to a cooling stage in which the mixture is cooled from about 600° C. down to about 150° C. and the thereby generated steam is withdrawn and utilized. The cooled waste gas mixture may be pressurized and function as a carrier gas for the entrainment therein of additional waste substances of high caloric value, and the carrier gas together with the additional waste substances entrained therein may be combusted at a temperature above 800° C. The additional waste substances may be combustible material separated during automobile salvage, reject material from paper recycling or plastic-containing residues from refuse treatment.

The apparatus for carrying out the process according to the invention, by which a rotary drum furnace is provided for melting the processed scrap and by which the metal melt of the rotary drum furnace is treated, post-purified and alloyed in a heat retention oven (converter), is characterized in that a mixing chamber is provided downstream of a shavings dryer and the rotary drum furnace, in which mixing chamber the waste gases leaving the shavings dryer and the rotary drum furnace are mixed and subsequently can be fed via a coarse separator to a boiler, that a draft fan is provided between the boiler and a combustion furnace and that a purification means is connected after the combustion furnace, which also receives the waste gas from the heat retention oven.

The main advantage of the process and apparatus for performing the invention is that the waste gases practically free of hazardous substances fulfill the stringent legal requirements in a technically simple and very effective manner, where the gases also serve for the production of steam and the combustion of waste substances at the same time.

BRIEF DESCRIPTION OF THE DRAWING

The drawing is a flow diagram of a preferred embodiment of the invention.

DETAILED DESCRIPTION OF PREFERRED EMBODIMENT OF THE INVENTION

A preferred embodiment of the invention is described by reference to the drawing.

The scrap processing and the melting of the processed aluminum scrap takes place according to the conventional process.

The essential feature is the collection of the individual waste gas flows and their post-combustion and the generation of the necessary energy for this from residue substances. The waste gas flows of a rotary drum furnace 1, a converter 3 and a shavings dryer 2 are collected separately. The waste gas flows of the rotary drum furnace 1 at about 800° C. to 900° C. and the shavings dryer 2 at about 400° C. to 500° C. are combined in a mixing chamber 4 and fed past a coarse separator 5 to a boiler house 6. The host gas flow of about 600° C. is cooled to about 150° C. in the boiler house 6 and steam is thereby generated. The waste gas flow is pressurized by means of a subsequent draft fan 7 and fed to a combustion furnace 8, for example, as carrier gas to a fluidized bed furnace. The waste gas from the secondary aluminum melting plant is completely combusted in this furnace at temperatures above 800° C. To achieve the high post-combustion temperatures, additional waste substances of high caloric value are employed in the combustion furnace 8, for example light shredder fractions from automobile salvage, reject materials from paper recycling or plastic-containing residues from refuse treatment, and are completely combusted at temperatures above 800° C. A purification system 9 consisting of a particle filter, gas washer and active charcoal filter are employed for the subsequent purification. The waste gas flow of the converter 3 is directly fed to the gas washer by means of a draft fan. The purified gases are led off by means of a stack 10.

We claim:

1. A process reducing air pollution in a secondary aluminum melting plant, comprising heating a batch of aluminum shavings in a dryer thereby to generate waste gases, in a rotary furnace melting a batch of aluminum-containing scrap which is uniform with respect to its proportion of aluminum thereby to generate waste gases, conducting the waste gases from the dryer and from the furnace to a mixing chamber, simultaneously with the foregoing in a converter metallurgically treating, refining and alloying a batch of melted aluminum which has been produced in the rotary furnace thereby to generate waste gases, conducting the waste gazes from the mixing chamber to a boiler thereby to cool the waste gases and generate steam, completely combusting the cooled waste gases by feeding the cooled waste gases to a combustion furnace under pressure by means of a draft fan and supplying the combustion furnace with combustible waste material, passing gaseous products of combustion from the combustion furnace to and through a particle filter, gas washer and active charcoal filter and therefrom to a stack and passing the waste gases from the converter to and through the gas washer and the active charcoal filter to the stack.

2. A process according to claim 1, in which the waste gases from the rotary furnace are at a temperature of about 800° C. to 900° C., the waste gases from the dryer are at a temperature of about 400° C. to 500° C. and the cooling of the waste gases from the mixing chamber by the boiler is from about 600° C. to about 150° C.

3. A process according to claim 2, in which the combustion furnace is a fluidized bed furnace, the cooled waste gases are a carrier gas for the combustible waste material in the combustion furnace and the temperature in the combustion furnace is about 800°.

4. A process according to claim 3, in which the combustible waste material is a by-product of automobile salvage, reject material from paper recycling or plastic-containing residues from refuse treatment.

* * * * *